United States Patent
Wilkins

(10) Patent No.: US 8,537,456 B1
(45) Date of Patent: Sep. 17, 2013

(54) PHOTONIC CRYSTAL APPARATUS AND ASSOCIATED METHOD

(75) Inventor: Donald F. Wilkins, O'Fallon, MO (US)

(73) Assignee: The Boeing Company, Chicago, IL (US)

( * ) Notice: Subject to any disclaimer, the term of this patent is extended or adjusted under 35 U.S.C. 154(b) by 621 days.

(21) Appl. No.: 12/542,192

(22) Filed: Aug. 17, 2009

(51) Int. Cl.
  *G02F 1/00* (2006.01)
  *G02F 1/29* (2006.01)

(52) U.S. Cl.
  USPC .......................................... 359/298; 359/321

(58) Field of Classification Search
  USPC ........... 385/129, 130; 257/97, 103; 359/245, 359/321, 298
  See application file for complete search history.

(56) References Cited

U.S. PATENT DOCUMENTS

| | | | |
|---|---|---|---|
| 4,638,309 A | 1/1987 | Ott | |
| 4,680,579 A | 7/1987 | Ott | |
| 5,365,283 A | 11/1994 | Doherty et al. | |
| 5,392,081 A | 2/1995 | Tarnay et al. | |
| 5,467,146 A | 11/1995 | Huang et al. | |
| 5,657,099 A | 8/1997 | Doherty et al. | |
| 5,658,063 A | 8/1997 | Nasserbakht | |
| 6,072,443 A | 6/2000 | Nasserbakht et al. | |
| 6,643,069 B2 | 11/2003 | Dewald | |
| 6,788,469 B2 | 9/2004 | Dewald et al. | |
| 6,906,687 B2 | 6/2005 | Werner | |
| 7,385,747 B2 | 6/2008 | Dewald et al. | |
| 7,405,860 B2 | 7/2008 | Huibers et al. | |
| 7,450,297 B2 | 11/2008 | DiCarlo et al. | |
| 7,537,347 B2 | 5/2009 | Dewald | |
| 7,742,662 B2 * | 6/2010 | Cunningham | 385/12 |
| 2004/0213534 A9 * | 10/2004 | Matsuura et al. | 385/129 |
| 2009/0212265 A1 * | 8/2009 | Steinhardt et al. | 252/501.1 |

* cited by examiner

*Primary Examiner* — Mahidere Sahle
(74) *Attorney, Agent, or Firm* — Alston & Bird LLP

(57) ABSTRACT

A photonic crystal apparatus and method are provided. The photonic crystal apparatus includes an electromagnetic signal source configured to provide electromagnetic signals. The photonic crystal apparatus also includes a photonic crystal configured to receive the electromagnetic signals from the electromagnetic signal source and to direct the electromagnetic signals along a predefined path through the photonic crystal when the photonic crystal is undistorted. The photonic crystal apparatus may also include a driver configured to selectively cause a portion of the photonic crystal to alternate between a distorted state and an undistorted state. In instances in which the photonic crystal is in the distorted state, the photonic crystal is configured to redirect the electromagnetic signals in a different direction than the predefined path.

22 Claims, 3 Drawing Sheets

PHOTONIC CRYSTAL APPARATUS AND ASSOCIATED METHOD

TECHNOLOGICAL FIELD

Embodiments of the present disclosure relate generally to methods and apparatus controllably redirecting electromagnetic signals and, more particularly, to methods and apparatus for employing a photonic crystal for controllably redirecting electromagnetic signals.

BACKGROUND

Displays are utilized in a wide variety of applications. One type of display is a projection display that employs a laser as a signal source. In instances in which the projection display is to be a color display, the projection display may include three lasers for providing signals having the three primary colors. These projection displays may also include a rotating mirror, such as a biaxial rotating mirror, in order to raster scan the signals provided by the lasers across a screen in a predefined manner. In relatively small projection displays, the rotating mirror may be a microelectromechanical system (MEMS) mirror that is configured to rotate along two axes so as to raster scan the signals provided by the lasers in order to create the desired image.

The lasers that may be employed by such projection systems may be relatively expensive and, as such, may undesirably increase the costs of the projection display. The lasers may also require a meaningful amount of power which may limit the operational life of a projection display, particularly in instances in which the projection display is power-constrained, such as in instances in which the projection display relies upon battery power. Because of the inherent inefficiency of the lasing process, lasers may also disadvantageously generate an appreciable amount of heat. If not properly managed, the heat generated by the lasers may create thermal distortion within the image and therefore adversely affect the color stabilization of the image.

Of the red, green and blue lasers employed in a color projection display, a laser configured to generate green light may pose more challenges since laser diodes that emit green light are not readily available. As such, in order to generate green light, an infrared (IR) diode laser, such as a laser diode, may be utilized in conjunction with a frequency doubler, such as a periodically poled lithium niobate (PPLN) crystal. The frequency doubler divides the wavelength of the IR signal in half so that an IR signal having a wavelength of 1060 nanometers can be frequency doubled to produce a green signal having a wavelength of 530 nanometers. This frequency doubling process, however, is a non-linear process having relatively low conversion efficiency, thereby adversely affecting the power consumption of the projection display. In this regard, an IR diode laser generally requires a substantial current to generate an output that may be utilized to create green light. As a result, the temperature of the IR laser may rise substantially which, in turn, may cause the wavelength of the signals generated by the IR laser to change. As the wavelength of the signals generated by the IR laser moves away from the wavelength that is required by the frequency doubling crystal to generate green light, the amount of green light generated by the frequency doubling crystal will be reduced. As such, the IR laser generally requires relatively rigorous control of its temperature, thereby increasing the cost and potentially decreasing the efficiency of the laser.

Additionally, displays, such as projection displays, are increasingly being employed in applications that require relatively small displays, such as cellular telephones, media players and the like. In some instances, however, projection displays that rely upon lasers for the generation of the signal are too large to satisfy the size requirement of these applications. It would therefore be desirable to provide an improved projection display including, for example, a projection display that could be relatively small in order to be employed in a wider variety of applications.

BRIEF SUMMARY

A photonic crystal apparatus and method are provided according to embodiments of the present disclosure which may be employed in a variety of applications including, for example, as an improved projection display. By way of example, the photonic crystal apparatus and method may be more economical, may consume less power and/or may require less thermal management than at least some laser-based projection displays. Moreover, the photonic crystal apparatus and method may be incorporated in devices, such as displays, having a relatively small form factor, thereby increasing the variety of applications that may be serviced by the photonic crystal apparatus and method of embodiments of the present disclosure.

In one embodiment, a photonic crystal apparatus is provided that includes an electromagnetic signal source configured to provide electromagnetic signals. The photonic crystal apparatus of this embodiment also includes a photonic crystal configured to receive the electromagnetic signals from the electromagnetic signal source and to direct the electromagnetic signals along a predefined path through the photonic crystal when the photonic crystal is undistorted. For example, the photonic crystal may include a rod and/or a hole defining the predefined path therethrough. The photonic crystal apparatus of this embodiment also includes a driver configured to selectively cause a portion of the photonic crystal to alternate between a distorted state and an undistorted state such that a photonic crystal apparatus performs in a dynamic manner. In instances in which the photonic crystal is in the distorted state, the photonic crystal is configured to redirect the electromagnetic signals in a different direction than the predefined path.

In one embodiment, the photonic crystal apparatus includes a plurality of drivers configured to selectively cause different respective portions of the photonic crystal to alternate between a distorted state and the undistorted state. In this embodiment, the photonic crystal apparatus may also include a controller configured to actuate respective drivers at different times. A driver, upon actuation, is configured to cause a respective portion of the photonic crystal to have a distorted state such that the electromagnetic signals are redirected from different portions of the photonic crystal at the different times. The plurality of drivers may be configured in a multi-dimensional arrangement relative to the photonic crystal.

The photonic crystal apparatus of one embodiment includes a photonic crystal having a first surface with the photonic crystal in a distorted state being configured to redirect the electromagnetic signals outwardly from the first surface. In this embodiment, the photonic crystal may be configured to direct the electromagnetic signals, prior to redirection, along a serpentine path through the photonic crystal.

The electromagnetic signal source of one embodiment includes a light source configured to provide light signals and a modulator configured to alter the frequency of the light signals. In another embodiment, the photonic crystal apparatus includes first and second light sources configured to provide first and second light signals, respectively. The first and second light signals of this embodiment have different frequencies. The photonic crystal apparatus of this embodiment may also include first and second photonic crystals configured to receive the first and second light signals, respectively, and, when undistorted, to direct the respective light signals therethrough along predefined paths.

In another embodiment, a method is provided that includes receiving electromagnetic signals with a photonic crystal and directing the electromagnetic signals along a predefined path through the photonic crystal when the photonic crystal is undistorted. For example, the electromagnetic signals may be directed along a serpentine path through the photonic crystal. The method of this embodiment also selectively causes a portion of the photonic crystal to alternate between a distorted state and an undistorted state and redirects the electromagnetic signals in a different direction than the predefined path in instances in which the photonic crystal is in the distorted state. For example, in embodiments in which the photonic crystal has a first surface, the electromagnetic signals may be redirected outwardly from the first surface.

In regards to selectively causing a portion of a photonic crystal to alternate between distorted and undistorted states, the method of one embodiment selectively causes different respective portions of the photonic crystal to alternate between the distorted state and the undistorted state. In this regard, the different respective portions of the photonic crystal may be selectively caused to have a different state at different times such that the electromagnetic signals are redirected from the different portions of the photonic crystal at the different times.

In regards to the receipt of the electromagnetic signals, the electromagnetic signals may be light signals and the method of this embodiment may also include altering a frequency of the light signals prior to receipt by the photonic crystal, thereby permitting light having different colors to be controllably redirected. In one embodiment, the method may receive first and second light signals having different frequencies with first and second photonic crystals, respectively. In this embodiment, the first and second light signals may be directed along respective predefined paths through the first and second photonic crystals, respectively.

The features, functions and advantages that have been discussed can be achieved independently in various embodiments of the present disclosure or may be combined in yet other embodiments, further details of which can be seen with reference to the following description and drawings.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION

The present disclosure now will be described more fully hereinafter with reference to the accompanying drawings, in which some, but not all embodiments are shown. Indeed, this disclosure may be embodied in many different forms and should not be construed as limited to the embodiments set forth herein; rather, these embodiments are provided so that this disclosure will satisfy applicable legal requirements. Like numbers refer to like elements throughout.

A photonic crystal apparatus 10 is provided according to embodiments of the present disclosure. The photonic crystal apparatus 10 may be employed in a variety of applications. For example, the photonic crystal apparatus 10 may be configured as a projection display. As a result of its configuration, the photonic crystal apparatus 10 can have a relatively small size and therefore provide a projection display for relatively small devices, such as cellular telephones, media players or the like. In addition, a projection display employing the photonic crystal apparatus 10 of embodiments of the present disclosure may be utilized to provide a display on eyewear in order to provide augmented vision and may be utilized in heads-up display applications. However, the photonic crystal apparatus 10 can be utilized in a variety of applications in addition to a projection display including use as a directional antenna as described below.

Figure 1:
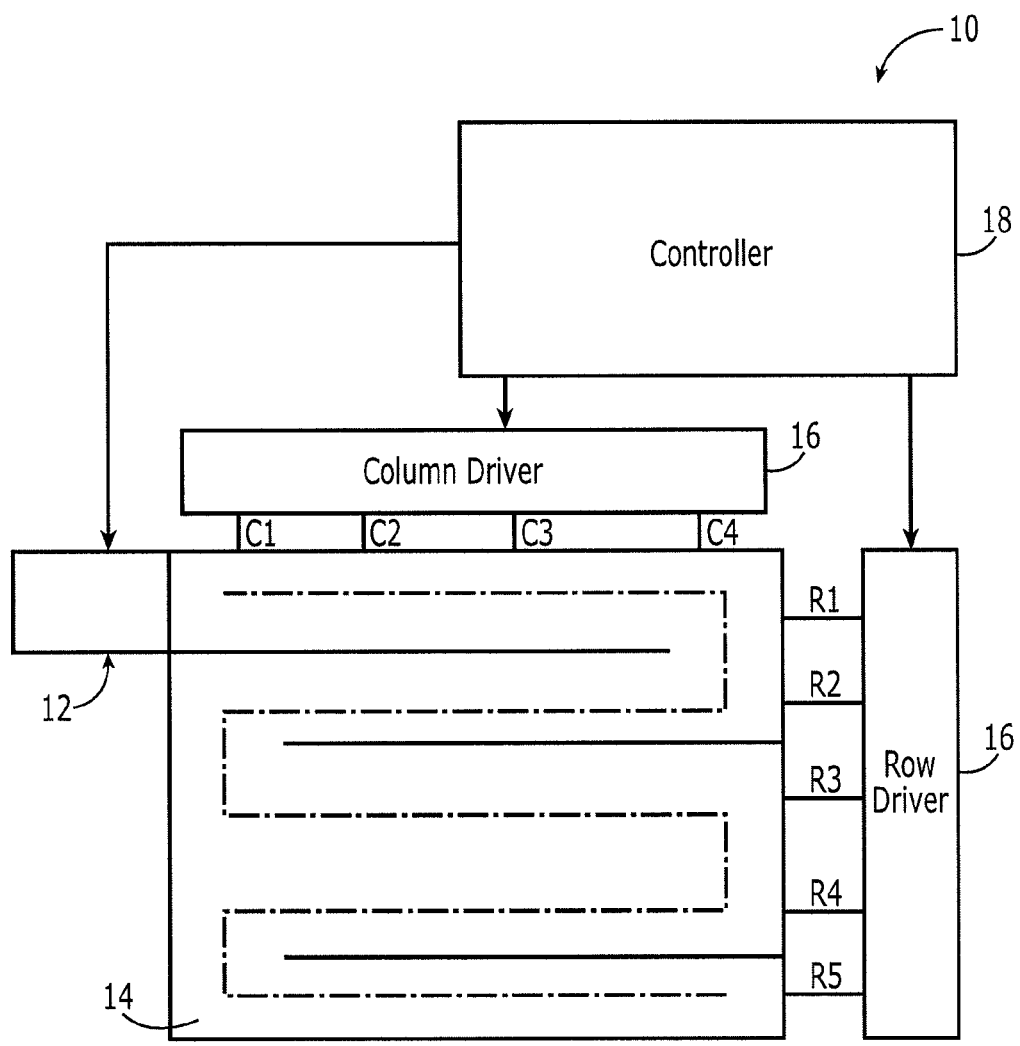
FIG. 1 is a schematic representation of a photonic crystal apparatus according to one embodiment to the present disclosure.

Referring to FIG. 1, a photonic crystal apparatus 10 according to one embodiment of the present disclosure is depicted. The photonic crystal apparatus 10 includes an electromagnetic signal source 12 configured to provide electromagnetic signals. The photonic crystal apparatus 10 may include a variety of different types of electromagnetic signal sources 12 for providing signals having an electromagnetic frequency, such as radio frequency signals, visible signals, etc. In one embodiment described below, the electromagnetic signal source 12 is a light source, such as a light emitting diode.

The photonic crystal apparatus 10 also includes a photonic crystal 14. A photonic crystal 14 is a periodic optical nanostructure, such as a periodic dielectric or metallo-dielectric nanostructure. A photonic crystal 14 generally affects the propagation of electromagnetic signals in the same manner that the periodicity of a semiconductor crystal affects the electron motion by defining allowed and forbidden electronic energy bands. Photonic crystals 14 may include regularly repeating internal regions having relatively high and relatively low dielectric constants.

The photonic crystal 14 is configured to receive the electromagnetic signals from the electromagnetic signal source 12 and to direct the electromagnetic signals along a predefined path through the photonic crystal 14 when the photonic crystal 14 is in an undistorted state. The photonic crystal 14 may be configured to define differently shaped predefined paths in different applications. In the embodiment of FIG. 1, however, the predefined path is a serpentine path through the photonic crystal 14. As shown in dashed lines in FIG. 1, the predefined path along which the photonic crystal 14 directs the electromagnetic signals while the photonic crystal 14 is in an undistorted state extends from the upper left portion of the photonic crystal 14 to the lower right portion of the photonic crystal 14.

The photonic crystal 14 can define the predefined path in various manners. In one embodiment, the photonic crystal 14 defines a hole or open passageway that extends through the photonic crystal 14 and defines the predefined path in that the electromagnetic signals preferentially propagate through the hole or open passageway, such as along the serpentine path of FIG. 1. Alternatively, the photonic crystal 14 may include a rod that extends through the remainder of the photonic crystal 14 and defines the predefined path therethrough. In this regard, the rod may be constructed in such a manner that the electromagnetic signals preferentially propagate along or through the rod, such as in a serpentine manner from the upper left portion of the photonic crystal 14 to the lower right portion of the photonic crystal 14 in the illustrated embodiment of FIG. 1. Although the rod may be constructed in various manners, the rod of one embodiment is constructed by photolithographically defining a hole or open passageway through the photonic crystal 14 and then filling the hole or open passageway with the rod material.

The photonic crystal apparatus 10 of the embodiment of FIG. 1 is configured to function as a projection display. In this regard, the projection display is configured to be viewed from the perspective shown in FIG. 1 such that the viewer sees an image created by signals projected outward from the page. As a result, the electromagnetic signals that propagate along the predefined path through the photonic crystal 14 in an undistorted state are not visible while propagating along the predefined path. Instead, the electromagnetic signals must be redirected in a direction out of the page in terms of the embodiment of FIG. 1 to be visible. By way of example, the photonic crystal 14 of FIG. 1 may have a first surface that faces the viewer and extends parallel to the plane through which the predefined path extends. As such, the photonic crystal apparatus 10 may be configured such that the electromagnetic signals may be selectively redirected out of the page, such as in a direction generally perpendicular to the first surface of the photonic crystal 14.

In order to redirect the electromagnetic signals, the photonic crystal apparatus 10 may include a driver 16 configured to selectively cause a portion of the photonic crystal 14 to alternate between a distorted state and an undistorted state. While the electromagnetic signals propagate along the predefined path while the photonic crystal 14 is in the undistorted state, the electromagnetic signals are redirected in a different direction than along the predefined path in instances in which the photonic crystal 14 is in the distorted state. Thus, the driver 16 may dynamically and switchably control the propagation of the electromagnetic signals so as to either continue along the predefined path or to be redirected in a different direction, such as in a direction out of the page relative to the embodiment of FIG. 1, such as in a direction generally perpendicular to the first surface of the photonic crystal 14.

In one embodiment, a driver 16 is embodied as a transistor, such as a thin film transistor. In this embodiment, the transistor may be controllably switched between active and inactive states with the transistor conducting current in the active state and being generally nonconductive in the inactive state. The transistor may be electrically connected to a portion of the photonic crystal 14 such that the transistor may be switched to the active state in order to provide electrical current to the respective portion of the photonic crystal 14 which, in turn, causes that portion of the photonic crystal 14 to be distorted and to thereby redirect electromagnetic signals that would otherwise pass through that portion of the photonic crystal 14.

In contrast, in the inactive state, the transistor of the embodiment may not conduct electrical current to the photonic crystal 14 such that electromagnetic signals are not redirected by that portion of the photonic crystal 14, but instead continue along the predefined path.

Figure 2:
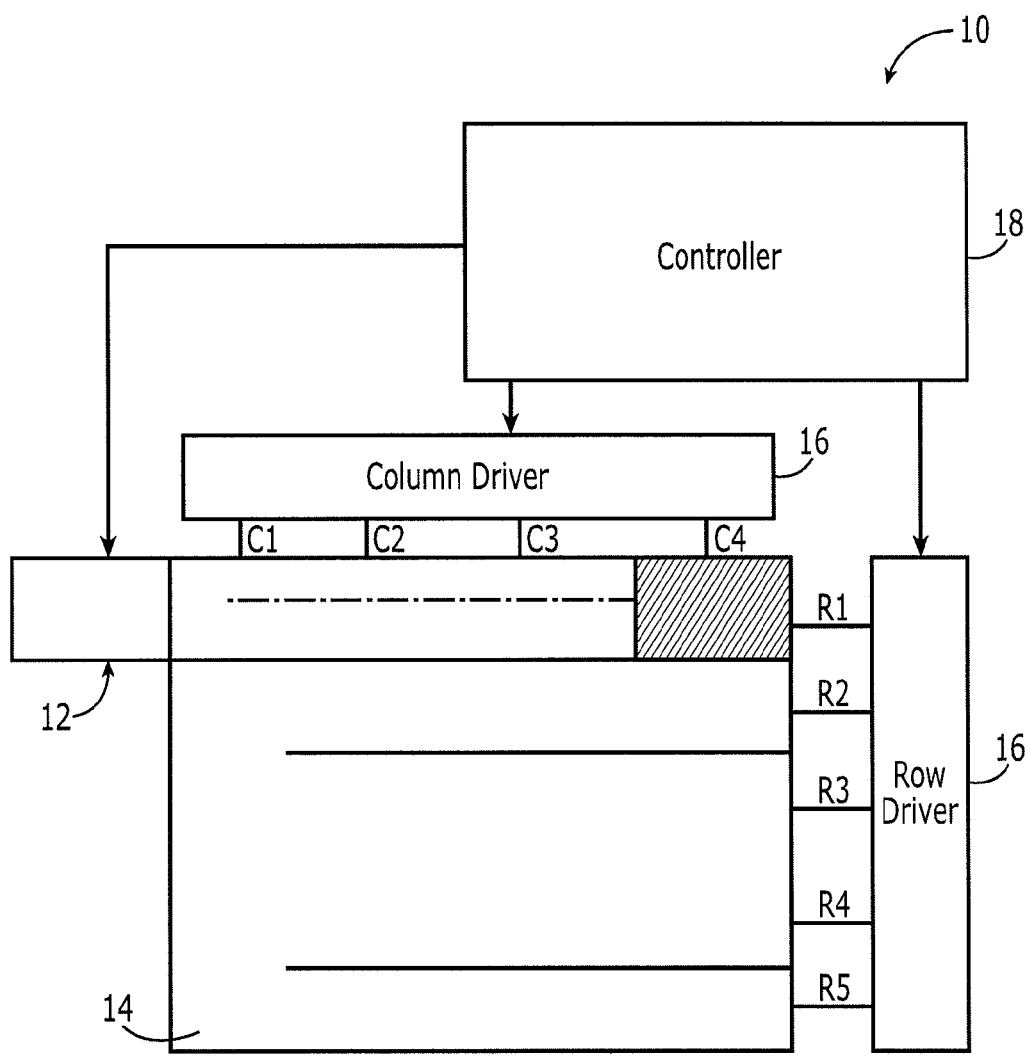
FIG. 2 is a schematic representation of a photonic crystal apparatus of FIG. 1 in which the electromagnetic signals propagating through the photonic crystal have been redirected.

In the embodiment depicted in FIGS. 1 and 2, the photonic crystal apparatus 10 includes a plurality of drivers 16. The plurality of drivers may be positioned in a multi-dimensional arrangement relative to the photonic crystal 14, such as along two orthogonal axes, e.g., x- and y-axes so as to have column drivers extending along the x-axis and row drivers extending along the y-axis, in order to divide the photonic crystal 14 into a two-dimensional array. In the embodiment of FIGS. 1 and 2, a matrix of transistors may be positioned upon the photonic crystal 14. While the matrix of transistors may have various configurations, the transistors of one embodiment are arranged in a two-dimensional array having a plurality of rows, e.g., row driver, and a plurality of columns, e.g., column driver. As shown in FIGS. 1 and 2, the individual transistors may then be individually activated by actuating both the row and the column associated with the transistor so as to select the respective transistor. In an embodiment in which the transistors are arranged in four columns and in five rows, e.g., C1, C2, C3, C4 and R1, R2, R3, R4, R5, the upper right most transistor may be switched to an active state by activating the right most column C4 and the upper most row R1. The transistor, upon being switched to the active state, may distort the respective portion of the photonic crystal 14 and may then redirect the electromagnetic signals that are propagating along the predefined path, such as in a direction out of the page, as represented by the shading of that portion of the photonic crystal 14 in FIG. 2. By deactivating the upper right most transistor and then actuating another transistor, another portion of the photonic crystal may be distorted such that electromagnetic signals are redirected from the other portion of the photonic crystal 14.

Figure 3A:
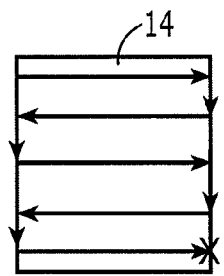
FIGS. 3a-3d are a series of views of the photonic crystal of one embodiment of the present disclosure illustrating the manner in which the electromagnetic signals emitted by the photonic crystal apparatus are scanned across the photonic crystal.
Figure 3B:
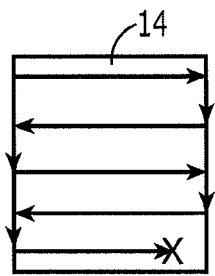
Figure 3C:
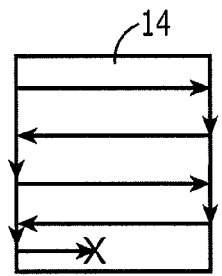
Figure 3D:
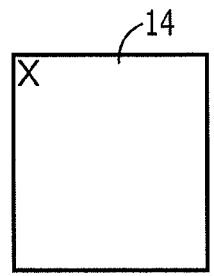

In a two-dimensional embodiment such as shown in FIGS. 1 and 2, the portion of the photonic crystal 14 that is distorted and which therefore redirects the electromagnetic signals may be altered according to a predefined pattern, such as in accordance with a raster scan pattern. In this regard, FIGS. 3a-3d depict a sequence of views of the photonic crystal 14 and the propagation of the electromagnetic signals therethrough or therefrom. In this regard, FIGS. 3a-3c depict electromagnetic signals propagating through the photonic crystal 14 along the predefined path with the horizontal and vertical lines with arrowheads indicating the direction of propagation of the signals. In FIG. 3a, the lower right hand portion of the photonic crystal 14 is distorted, such as by actuating the transistor associated with the lower right hand portions of the photonic crystal 14, e.g., the transistor corresponding to C4, R5 in the embodiment of FIG. 2, such that the electromagnetic signals propagating along the predefined path are redirected, such as in a direction out of the photonic crystal 14, as indicated by the X. Thereafter, as shown in FIG. 3b, the lower right hand portion of the photonic crystal 14 is allowed to return to the undistorted state, such as by deactuating the transistor associated with the lower right hand portion of the photonic crystal 14. However, that portion of the photonic crystal 14 immediately to the left of the lower right hand portion of the photonic crystal 14 is then distorted, such as by actuation of a transistor associated with that portion of the photonic crystal 14, e.g., the transistor corresponding to C3, R5 in the embodiment of FIG. 2. The distorted portion of the photonic crystal 14 again redirects the electromagnetic signals, such as in a direction out of the photonic crystal 14, as indicated by the X in FIG. 3b. This process may be then repeated with different portions of the photonic crystal 14 being distorted at different times. As indicated by the sequence of FIGS. 3a-3c, the portions of the photonic crystal 14 that are distorted may be selected in accordance with a raster scan pattern such that portions of the photonic crystal 14 that are distorted move right to left along the lower most row prior to moving left to right across the row second from the bottom and so on until the upper left most portion of the photonic crystal 14 is distorted and electromagnetic signals are redirected therefrom as depicted in FIG. 3d, such as a result of the actuation of the transistor corresponding to C1, R1 in the embodiment of FIG. 2. The raster scan pattern by which the photonic crystal 14 is selectively distorted may then be repeated any number of times. While a raster scan pattern is depicted in FIG. 3, portions of the photonic crystal 14 may be distorted over time in accordance with other patterns, if so desired.

In one embodiment in which the photonic crystal apparatus 10 forms a projection display, the electromagnetic signal source 12 is a light source, such as a light emitting diode. The light source is configured to emit light signals, such as visible light signals, that propagate along the predefined path defined by the photonic crystal. By selectively distorting different portions of the photonic crystal 14 in accordance with a predefined pattern over time, the light signals may be redirected out of the photonic crystal 14 and toward a viewer so as to create a display or image for the viewer. In accordance with the embodiment depicted in FIGS. 3a-3d, the portions of the photonic crystal 14 may be distorted in accordance with a raster scan pattern, with the raster scan pattern being repeated at a frequency that is sufficiently great, such as thirty times a second, such that the scanning of the optical signals across the photonic crystal 14 is imperceptible to a viewer, and the image created by the combination of the optical signals redirected from each of the different portions of a photonic crystal 14 is visible to the viewer.

In instances in which the light source emits visible light, the light source may be configured to emit white light or light of any particular color. In one embodiment in which the visible signals are to have a particular color, the photonic crystal apparatus 10 may also include a modulator for receiving the light signals provided by the light source and for altering the frequency of the light signals in a predetermined manner so as to create light having the desired color. The modulated light signals may then be provided to the photonic crystal 14 for propagation along the predefined path and redirection by a distorted portion of the photonic crystal 14. By differently modulating the light signal as different portions of the photonic crystal 14 are distorted, the light signals redirected from the photonic crystal 14 may have different colors at different locations, thereby providing a multi-color image for the viewer.

Figure 4:
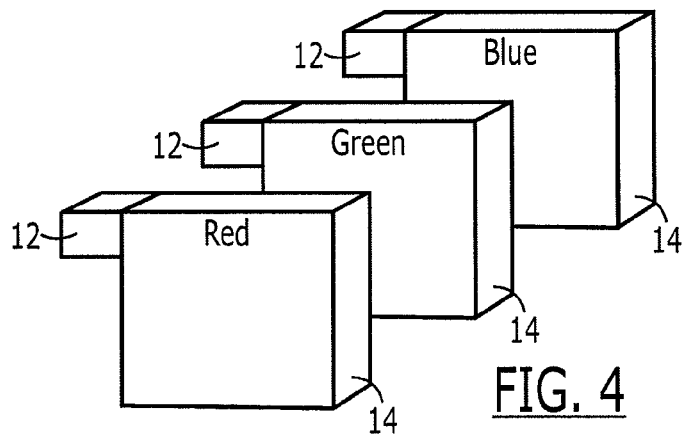
FIG. 4 is a schematic representation of a photonic crystal apparatus of another embodiment of the present disclosure which includes a plurality of signal sources and a plurality of photonic crystals.

In an alternative embodiment in which the projection display is multi-color, the photonic crystal apparatus 10 can include a plurality of optical sources and a plurality of photonic crystals 14 associated with respective ones of the optical sources. Each optical source may have a different color, such as red, green and blue, such that the red light propagates along a predefined path through a first photonic crystal 14 in an undistorted state, the green light propagates along a predefined path through a second photonic crystal 14 in an undistorted state, and blue light propagates along the predefined path of a third photonic crystal 14 in an undistorted state. The plurality of photonic crystals 14 may be stacked in an aligned manner, as shown in an exploded view in FIG. 4, such that the predefined path of each photonic crystal 14 is aligned with the predefined paths of the other photonic crystals 14 and such that each photonic crystal 14 is configured to redirect the light in the same direction in response to portions of the photonic crystals 14 being in the distorted state.

Each photonic crystal 14 may include an associated driver 16, such as an associated multi-dimensional arrangement of drivers 16 for selectively distorting different portions of the respective photonic crystal 14. In one embodiment, correspondingly positioned drivers 16 associated with each photonic crystal 14 may be actuated at the same time and in accordance with the same predetermined pattern. Thus, corresponding portions of each photonic crystal 14 may redirect the respective light signals at the same time, with the portion of each photonic crystal 14 that is distorted being selected in accordance with the same predetermined pattern over the course of time. As such, the photonic crystal apparatus 10 of this embodiment may generate a multi-color display for the viewer.

In the embodiment illustrated in FIGS. 1 and 2, the operation of the photonic crystal apparatus 10 may be controlled by a controller 18. The controller 18 may be embodied in various manners, including a processor, a computer, a computer workstation, or the like. Although the controller 18 may be embodied in hardware or firmware, the controller 18 of one embodiment includes a processor configured to access and execute computer program instructions stored in an associated memory device in order to provide the functionality described herein. While the illustrated embodiment includes a single controller 18, the photonic crystal apparatus 10 can include multiple controllers 18, if so desired. In one embodiment, the controller 18 is configured to provide control signals to the electromagnetic signal source 12 so as to actuate the electromagnetic signal source 12 in order to provide the electromagnetic signals and to deactuate the electromagnetic signal source 12 so as to cease the provision of electromagnetic signals. The controller 18 may also control the selective actuation of the drivers 16, such as the plurality of transistors. In this regard, a controller 18 may actuate a particular column and a particular row of transistors such that the transistor that lies in both the selected column and row is actuated and causes the corresponding portion of the photonic crystal 14 to be distorted. The controller 18 therefore can selectively actuate the transistors in accordance with the predetermined pattern described above.

By employing electromagnetic signal sources 12, such as light emitting diodes, the photonic crystal apparatus 10 of some embodiments may have a smaller form factor than at least some projection displays that utilize lasers as the signal source. Thus, the photonic crystal apparatus 10 may be employed in applications that have size limitations, such as the display of a cellular telephone, a media player or the like. Additionally, the use of electromagnetic signal sources 12, such as light emitting diodes, permits the photonic crystal apparatus 10 of one embodiment to be more economical and to consume less power than at least some projection displays that utilize lasers as the signal source, thereby facilitating the use of the photonic crystal apparatus 10 in power-constrained applications, such as in conjunction with mobile applications that rely upon battery power. Further, the use of electromagnetic signal sources 12, such as light emitting diodes, generates less heat than at least some projection displays that utilize lasers as the signal source, thereby simplifying the thermal management issues and potentially improving its performance.

Figure 5:
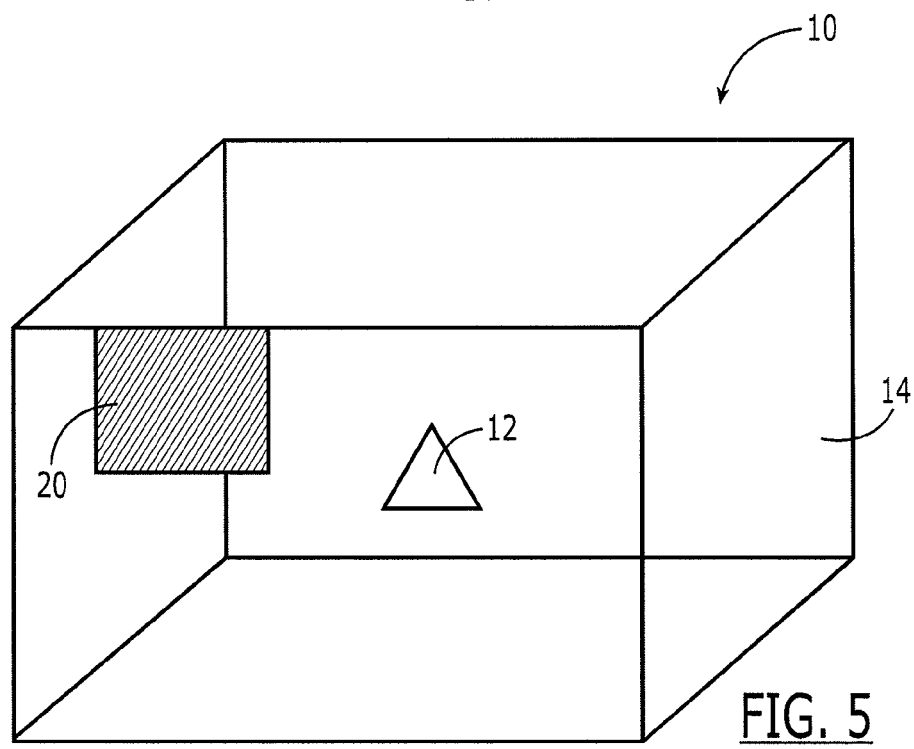
FIG. 5 is a schematic representation of a photonic crystal apparatus of another embodiment of the present disclosure.

The photonic crystal apparatus 10 may be employed in other applications in addition to, or instead of, its application as a projection display, such as a Q-switch. For example, a photonic crystal apparatus 10 may serve as a directional antenna as schematically shown, for example, in FIG. 5. In this embodiment, an electromagnetic signal source 12, such as a radio frequency signal source, may be positioned within or on one side of a three-dimensional photonic crystal 14. The photonic crystal 14 may be configured to define a predefined path that extends along various portions of each of the sides of the photonic crystal 14. In the undistorted state, the electromagnetic signals propagate along the predefined path, but are not redirected out of the photonic crystal 14. Drivers, such as transistors, may be associated with different portions of the different sides of the photonic crystal 14 such as by positioning an array of transistors upon each of the sides of the photonic crystal 14. By actuating a driver 16, the corresponding portion of the photonic crystal 14 is distorted, and the electromagnetic signals are redirected from that portion of the photonic crystal 14, such as in an outward direction, such as from that portion of the photonic crystal 14 of FIG. 5 that is shaded and designated as 20. By controlling the actuation of the drivers 16, such as by means of a controller 18, the direction along which the electromagnetic signals are emitted may be controlled such that the photonic crystal apparatus 10 of this embodiment functions as a directional antenna.

Many modifications and other embodiments of the disclosure set forth herein will come to mind to one skilled in the art to which these embodiments pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A photonic crystal apparatus comprising:
   a electromagnetic signal source configured to provide electromagnetic signals;
   a photonic crystal having a first surface and configured to receive the electromagnetic signals from the electromagnetic signal source, wherein the photonic crystal is configured to direct the electromagnetic signals along a predefined path that extends within a plane parallel to the first surface through the photonic crystal when the photonic crystal is undistorted; and
   a driver configured to selectively cause a portion of the photonic crystal to alternate between a distorted state and an undistorted state,
      wherein the photonic crystal in the distorted state is configured to redirect the electromagnetic signals in a different direction that is perpendicular to the plane through which the predefined path extends.

2. A photonic crystal apparatus according to claim 1 wherein the driver comprises a plurality of drivers configured to selectively cause different respective portions of the photonic crystal to alternate between the distorted state and the undistorted state.

3. A photonic crystal apparatus according to claim 2 further comprising a controller configured to actuate respective drivers at different times, wherein a driver, upon actuation, is configured to cause the respective portion of the photonic crystal to have the distorted state such that the electromagnetic signals are redirected from different portions of the photonic crystal at the different times.

4. A photonic crystal apparatus according to claim 2 wherein the plurality of drivers are configured in a multidimensional arrangement relative to the photonic crystal.

5. A photonic crystal apparatus according to claim 1 wherein the photonic crystal in the distorted state is configured to redirect the electromagnetic signals outwardly from the first surface.

6. A photonic crystal apparatus according to claim 5 wherein the photonic crystal is configured to direct the electromagnetic signals along a serpentine path therethrough.

7. A photonic crystal apparatus according to claim 1 wherein the photonic crystal comprises at least one of a rod or a hole extending within the plane and defining the predefined path therethrough.

8. A photonic crystal apparatus according to claim 1 wherein the electromagnetic signal source comprises a light source configured to provide light signals and a modulator configured to alter a frequency of the light signals.

9. A photonic crystal apparatus according to claim 1 wherein the electromagnetic signal source comprises first and second light sources configured to provide first and second light signals, respectively, wherein the first and second light signals have different frequencies, wherein the photonic crystal comprises first and second photonic crystals positioned in an aligned relationship and configured to receive the first and second light signals, respectively, and, when undistorted, to direct the respective light signals therethrough along the predefined path, and wherein the predefined paths defined by the first and second photonic crystals are aligned.

10. A photonic crystal apparatus comprising:
    a electromagnetic signal source configured to provide electromagnetic signals;
    a photonic crystal having a first surface and configured to receive the electromagnetic signals from the electromagnetic signal source, wherein the photonic crystal is configured to direct the electromagnetic signals along a predefined path that extends within a plane parallel to the first surface through the photonic crystal when the photonic crystal is undistorted; and
    a plurality of drivers configured to selectively cause different portions of the photonic crystal to alternate between a distorted state and an undistorted state,
       wherein the photonic crystal in the distorted state is configured to redirect the electromagnetic signals in a different direction than the predefined path with the different direction extending outwardly from the first surface.

11. A photonic crystal apparatus according to claim 10 further comprising a controller configured to actuate respective drivers at different times, wherein a driver, upon actuation, is configured to cause the respective portion of the photonic crystal to have the distorted state such that the electromagnetic signals are redirected from different portions of the photonic crystal at the different times.

12. A photonic crystal apparatus according to claim 10 wherein the electromagnetic signal source comprises a light source configured to provide light signals and a modulator configured to alter a frequency of the light signals.

13. A photonic crystal apparatus according to claim 10 wherein the electromagnetic signal source comprises first and second light sources configured to provide first and second light signals, respectively, wherein the first and second light signals have different frequencies, wherein the photonic crystal comprises first and second photonic crystals positioned in an aligned relationship and configured to receive the first and second light signals, respectively, and, when undistorted, to direct the respective light signals therethrough along the predefined path, and wherein the predefined paths defined by the first and second photonic crystals are aligned.

14. A method comprising:
receiving electromagnetic signals with a photonic crystal having a first surface;
directing the electromagnetic signals along a predefined path that extends within a plane parallel to the first surface through the photonic crystal when the photonic crystal is undistorted;
selectively causing a portion of the photonic crystal to alternate between a distorted state and an undistorted state; and
redirecting the electromagnetic signals in a different direction that is perpendicular to the plane through which the predefined path extends, in instances in which the photonic crystal is in the distorted state.

15. A method according to claim 14 wherein selectively causing comprises selectively causing different respective portions of the photonic crystal to alternate between the distorted state and the undistorted state.

16. A method according to claim 15 wherein selectively causing further comprises selectively causing the different respective portions of the photonic crystal to have the distorted state at different times such that the electromagnetic signals are redirected from the different portions of the photonic crystal at the different times.

17. A method according to claim 14 wherein the photonic crystal comprises a first surface, and wherein redirecting the electromagnetic signals comprises redirecting the electromagnetic signals outwardly from the first surface.

18. A method according to claim 17 wherein directing the electromagnetic signals comprises directing the electromagnetic signals along a serpentine path through the photonic crystal.

19. A method according to claim 14 wherein receiving electromagnetic signals comprises receiving light signals, and wherein the method further comprises altering a frequency of the light signals prior to receipt by the photonic crystal.

20. A method according to claim 14 wherein receiving electromagnetic signals comprises receiving first and second light signals having different frequencies with first and second photonic crystals, respectively, that are positioned in an aligned relationship, and wherein directing the electromagnetic signals comprises directing the first and second light signals along respective predefined paths through the first and second photonic crystals, respectively, that are also aligned.

21. A photonic crystal apparatus according to claim 10 wherein the photonic crystal comprises at least one of a rod or a hole extending within the plane and defining the predefined path therethrough.

22. A method according to claim 14 wherein directing the electromagnetic signals along a predefined path through the photonic crystal when the photonic crystal is undistorted comprises directing the electromagnetic signals through at least one of a rod or a hole extending within the plane and defining the predefined path therethrough.

* * * * *